June 13, 1933.     W. C. SHINN     1,913,963
LOCK
Filed Nov. 22, 1928
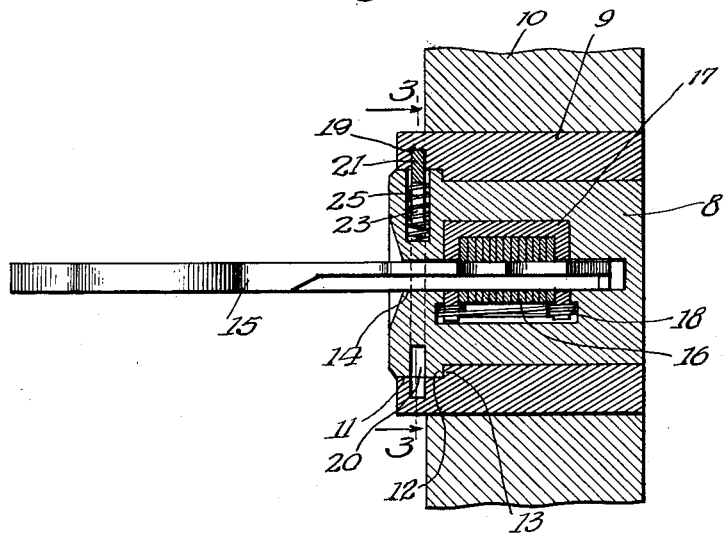
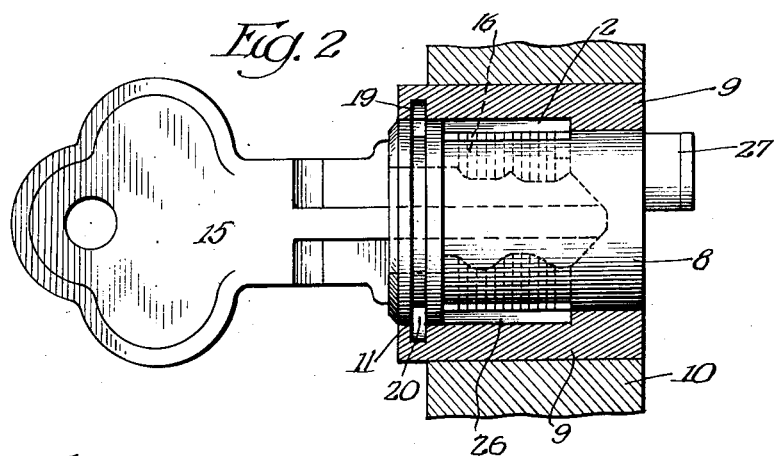
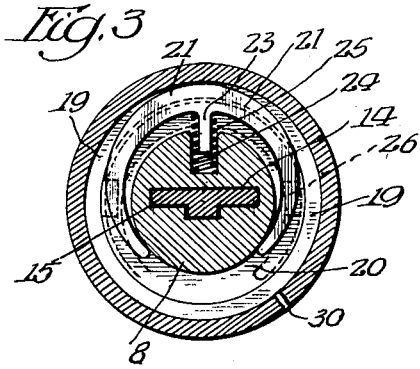
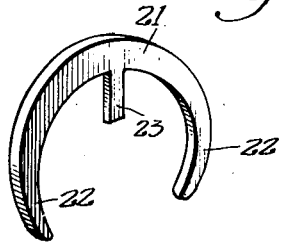
Inventor
William C. Shinn
By Fred Gerlach
his Atty.

Patented June 13, 1933

1,913,963

UNITED STATES PATENT OFFICE

WILLIAM C. SHINN, OF CHICAGO, ILLINOIS, ASSIGNOR TO CHICAGO LOCK COMPANY, OF CHICAGO, ILLINOIS, A CORPORATION OF ILLINOIS

LOCK

Application filed November 22, 1928. Serial No. 321,076.

The present invention relates generally to locks. More particularly the invention relates to that type of lock which is adapted primarily to be used in connection with the doors, transmission, spare tire carrier or ignition switch of an automobile, and consists of a tubular casing and a rotatable tumbler-equipped plug in the casing.

One object of the invention is to provide an automobile lock of this type which is generally of new and improved design and is so constructed that the casing thereof may be connected to or formed integrally with the element to which the lock is applied at the place where such element is manufactured, and the plug may be selected, and installed in the casing, at the place of manufacture or assembly of the automobile.

Another object of the invention is to provide a lock of the aforementioned type in which the plug is releasably held in the casing against withdrawal by means of a spring-pressed, movably mounted holder device which is of novel construction and design and is arranged so that it is shiftable into an inoperative position only when the plug is in its unlocked position.

Another object of the invention is to provide a lock of the character under consideration in which the holder device for the plug is crescent-shaped and is positioned in an annular groove in the plug.

A further object of the invention is the provision of simple means for preventing rotation of the crescent-shaped holder device relatively to the plug.

A still further object of the invention is to provide an automobile lock which consists of but a small number of parts and may be manufactured at a comparatively low and reasonable cost.

Other objects of the invention and the various advantages and characteristics of the present invention will be apparent to those skilled in the art from a consideration of the following detailed description.

The invention consists in the several novel features which are hereinafter set forth and are more particularly defined by claims at the conclusion hereof.

In the drawing which accompanies and forms a part of this specification or disclosure and in which like numerals of reference denote corresponding parts throughout the several views:

Figure 1 is a horizontal section of a lock embodying the invention;

Figure 2 is a view, partly in vertical section and partly in side elevation;

Figure 3 is a section on the line 3—3 of Figure 1; and

Figure 4 is a perspective of the device for releasably holding the plug against withdrawal from the casing.

The lock which forms the subject matter of the present invention is of the same general construction as that of Letters Patent of the United States No. 1,644,092, and comprises a cylindrical plug 8 and a cylindrical casing 9. The casing is adapted to be connected to or formed integrally with an element 10, such, for example, as one of the doors, the transmission, the spare tire carrier or the ignition switch of an automobile. The plug is insertable endwise into, and is mounted rotatably in, the casing. The outer end of the plug is enlarged and fits in an annular recess 11 in the casing and embodies an annular shoulder 12 which fits against a shoulder 13. The latter is formed in the casing 9 and defines the inner end of the recess 11. The plug is locked against rotation in the casing by means of a series of plate tumblers 16. These tumblers are movable transversely of the plug and have slots in the central portions thereof, through which a key 15 is adapted to pass when it is inserted into the plug by way of a slot 14. The ends of the tumblers are arranged so that they are brought into alignment with the periphery of the plug upon insertion of the key into the plug and permit the plug to be rotated. The tumblers are slidably held in a frame 17 and are urged outwardly by a spring 18. For a more detailed description of the tumblers, frame and spring and the operation of the tumblers, reference may be had to the aforementioned Patent No. 1,644,092.

The casing 9 is formed with a pair of diametrically opposite, longitudinally extending grooves 26. The outer ends of the plate tumblers 16 are forced into these grooves when the key is removed from the slot 14 and thus serve to lock the plug against rotation. When the key is inserted into the slot 14 and through the slots in the central portions of the tumblers, the ends of the tumblers are withdrawn from the grooves 26 and are aligned with the periphery of the plug so that the plug is rotatable, as previously pointed out. A lug 27 is formed on the inner end of the plug 8 and serves to control the lock bolt of the element with which the lock is associated.

An annular groove 19 is formed in the inner periphery of the casing 9. This groove is located at the outer end of the casing and registers with an annular groove 20 in the outer end of the plug 8. A device 21 is disposed in the grooves 19 and 20 and operates to hold the plug against withdrawal from the casing. This device is preferably formed of a metal stamping. It is crescent-shaped in conformation and embodies at the sides thereof a pair of oppositely facing, arcuate arms 22. The latter, as shown in Figure 3 of the drawing, lap the plug sufficiently to retain the device against removal from the plug and limit outward movement of the central portion of the device with respect to the groove 20. In order to prevent rotation of the holder device 21 relatively to the plug, a stem 23 is provided. This stem is formed integrally with, and projects inwardly from the central portion of the holder, and extends through a radial recess 24 in the plug. The recess is closed at its inner end and intersects the groove 20. A coil spring 25 is disposed in the recess, surrounds the stem and operates to force the central portion of the device outwardly so that a portion thereof is disposed in the groove 19 in the inner periphery of the casing and thus retains or locks the plug against withdrawal from the casing. In assembling the lock, the holder device 21 is held within the groove 20 against the action of the spring, and the plug is inserted into the casing. As soon as the plug is positioned so that the groove 20 registers with the groove 19, the spring 25 forces the central portion of the device 21 into the groove 19 and renders the device operative to prevent withdrawal or axial displacement of the plug with respect to the casing.

In some instances it is necessary to remove the plug for repair purposes or to effect a substitution of the plug. With this in view, a small hole 30 is drilled through the outer end of the casing 9. This hole is arranged so that it communicates with the groove 19 and permits a wire or like element to be inserted against the holder device in order to depress the latter for plug removing purposes. The holder device 21 is arranged so that it is accessible through the opening 30, only when the tumblers are aligned with the periphery of the plug by the regular key for the lock and the plug is rotated out of its locked position. As a result of this arrangement, the plug cannot be withdrawn from the casing when it is in its locked position.

The herein described lock consists of a small number of parts and hence may be manufactured at a low and reasonable cost. By virtue of the fact that the plug is readily removable from the casing, it is possible to form the casing as an integral part of the element with which the lock is associated at the place of manufacture of the element, and afterwards to insert the plug into place. Inasmuch as the holder 21 is crescent-shaped and has arms which embrace the sides of the plug, there is no likelihood of the device being ejected from the groove 20 by action of the spring when the plug is removed from the casing for repair or replacement purposes.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a lock, the combination of a casing adapted to be secured in an element, a plug insertable endwise into and rotatable in the casing, key-operable tumblers for locking the plug against rotation in the casing, the casing and plug having contiguous annular grooves, a holding device held in and conforming substantially to the groove in the plug, and adapted to extend into the groove in the casing to secure the plug against withdrawal from the casing and means for permitting the device to be moved into the plug to release the plug for withdrawal from the casing.

2. In a lock, the combination of a casing adapted to be secured in an element, a plug insertable endwise in and rotatable in the casing, key-operable tumblers for locking the plug against rotation in the casing, said casing and plug having contiguous annular grooves, a holding device held in and conforming substantially to the groove in the plug, and adapted to extend into the groove in the casing to secure the plug against withdrawal from the casing, said device being movable into the plug to release the plug for withdrawal from the casing, and a spring for pressing the device into the groove in the casing.

3. In a lock, the combination of a casing adapted to be secured in an element, a plug insertable endwise in and rotatable in the casing, key-operable tumblers for locking the plug against rotation in the casing, said casing and plug having contiguous circumferential grooves therein, and a holder movable radially in the groove in the plug and provided with oppositely extending arms embracing the plug and a portion extending into the groove in the casing and serving to secure the plug against withdrawal from the casing, the casing being provided with means by way of which the holder may be released from the casing when the plug is in its unlocked position.

4. In a lock, the combination of a casing adapted to be secured in an element, a plug insertable endwise in and rotatable in the casing, key-operable tumblers for locking the plug against rotation in the casing, said casing and plug having contiguous circumferential grooves therein, a device for holding the plug against withdrawal from the casing, movable radially in the groove in the plug and provided with oppositely facing arms embracing the plug, a portion extending into the groove in the casing and an inwardly extending stem projecting into the plug and serving to hold the device against rotation relatively to the plug, and a spring extending around the stem and arranged to press the device outwardly.

5. In a lock, the combination of a casing adapted to be secured in an element, a plug insertable endwise in and rotatable in the casing, key-operable tumblers for locking the plug against rotation in the casing, said casing and plug having contiguous circumferential grooves therein, a device for holding the plug against withdrawal from the casing, movable radially in the groove in the plug and provided with oppositely facing arms embracing the plug, a central portion extending into the groove in the casing, and an inwardly extending stem projecting into the plug and serving to hold the device against rotation relatively to the plug, and a spring around the stem for pressing the device outwardly, the casing being provided with a hole through which a tool may be inserted into engagement with the device so as to release the latter from the casing, when the plug is in its unlocked position.

6. In a lock, the combination of a casing adapted to be secured in an element, a plug insertable endwise into and rotatable in the casing, key-operable tumblers for locking the plug against rotation in the casing, said casing having an annular groove in its inner periphery, a holding device mounted for radial movement in the front end of the plug, said device being adapted to extend into the groove in the casing to secure the plug against withdrawal from the casing, and being movable out of the groove to release the plug for withdrawal, and a transverse hole in the front of the casing by way of which the holding device may be shifted to release the plug for withdrawal from the casing when the plug is in it unlocked position.

7. In a lock, the combination of a casing adapted to be secured in an element, a plug insertable endwise into and rotatable in the casing, key-operable tumblers for locking the plug in the casing, said casing and plug having contiguous circumferential grooves therein, a holding device in the groove in the plug provided with a pair of oppositely facing arms embracing the plug and embodying a central portion extending into the groove in the casing to lock the plug against withdrawal from the casing, and means for securing the holding device for rotation with the plug.

8. In a lock, the combination of a casing adapted to be secured in an element, a plug insertable endwise into and rotatable in the casing, key-operable tumblers for locking the plug in the casing, said casing and plug having contiguous circumferential grooves therein, a holding device disposed in the groove in the plug and embodying a pair of oppositely facing arms embracing the plug, a central portion extending into the groove in the casing and serving to hold the plug against removal from the casing, and a stem element projecting into the plug and operating to secure the device for rotation with the plug.

9. In a lock, the combination of a casing adapted to be secured in an element, a plug insertable endwise into and rotatable in the casing, key-operable tumblers for locking the plug in the casing, said casing and plug having contiguous circumferential grooves therein, a holding device disposed in the groove in the plug and embodying a pair of oppositely facing arms embracing the plug, a central portion extending into the groove in the casing and serving to hold the plug against removal from the casing, and a stem element projecting into the plug and operating to secure the device for rotation with the plug, the casing having a hole therein by way of which the device may be released from the groove in the casing, in order to permit removal of the plug from the casing.

10. In a lock, the combination of a casing having means forming an abutment, a plug insertable endwise into and rotatable in the casing and provided with a circumferential groove adjacent the abutment forming means, key-operable tumblers for locking the plug in the casing, a holding device movable radially in the groove in the plug and provided with a pair of oppositely facing arms embracing the plug and a central portion between the arms extending into lapped relation with the abutment forming means to lock the plug against withdrawal from the casing, means for securing the holding device for rotation with the plug, and means whereby the holding device may be released from said abutment forming means in order to permit of removal of the plug from the casing.

11. In a lock, the combination of a casing having means forming an abutment, a plug insertable endwise into and rotatable in the casing and provided with a circumferential groove adjacent the abutment forming means, key-operable tumblers for locking the plug in the casing, a holding device movable radially in the groove in the plug and embodying a pair of oppositely facing arms embracing the plug, a central portion extending into lapped relation with the abutment forming means and serving to hold the plug against removal from the casing, and a stem element projecting into the plug and operating to secure the device for rotation with the plug, and means whereby the holding device may be released from said abutment forming means in order to permit of removal of the plug from the casing.

12. In a lock, the combination of a casing having means forming an abutment, a plug insertable endwise into and rotatable in the casing and provided with a circumferential groove adjacent the abutment forming means, key-operable tumblers for locking the plug in the casing, a spring-pressed holding device movable radially in the groove in the plug and embodying a pair of oppositely facing arms embracing the plug, a central portion extending into lapped relation with the abutment forming means and serving to hold the plug against removal from the casing, and a stem element projecting into the plug and operating to secure the device for rotation with the plug, and means forming a hole whereby the device may be released from said abutment forming means in order to permit of removal of the plug from the casing.

13. In a lock, the combination of a casing having means forming an abutment, a plug insertable endwise into and rotatable in the casing and provided with a circumferential groove adjacent the abutment forming means, a holding device movable radially in the groove in the plug and embodying a pair of oppositely facing arms embracing the plug and a central portion between the arms extending into a lapped relation with the abutment forming means and serving to hold the plug against removal from the casing, and means whereby the holding device may be released from said abutment forming means in order to permit of removal of the plug from the casing.

14. In a lock mechanism, a housing, a tumbler barrel rotatable in said housing, a shoulder on said housing, said barrel having a peripheral groove, a yoke slidable in said groove and embracing opposite sides of said barrel, yielding means normally urging said yoke outwardly to engage a portion thereof behind said shoulder for locking said barrel in said housing, said yoke being retractable so as to unlock and permit the removal of said barrel from said housing.

Signed at Chicago, Illinois.

WILLIAM C. SHINN.